Patented Feb. 3, 1953

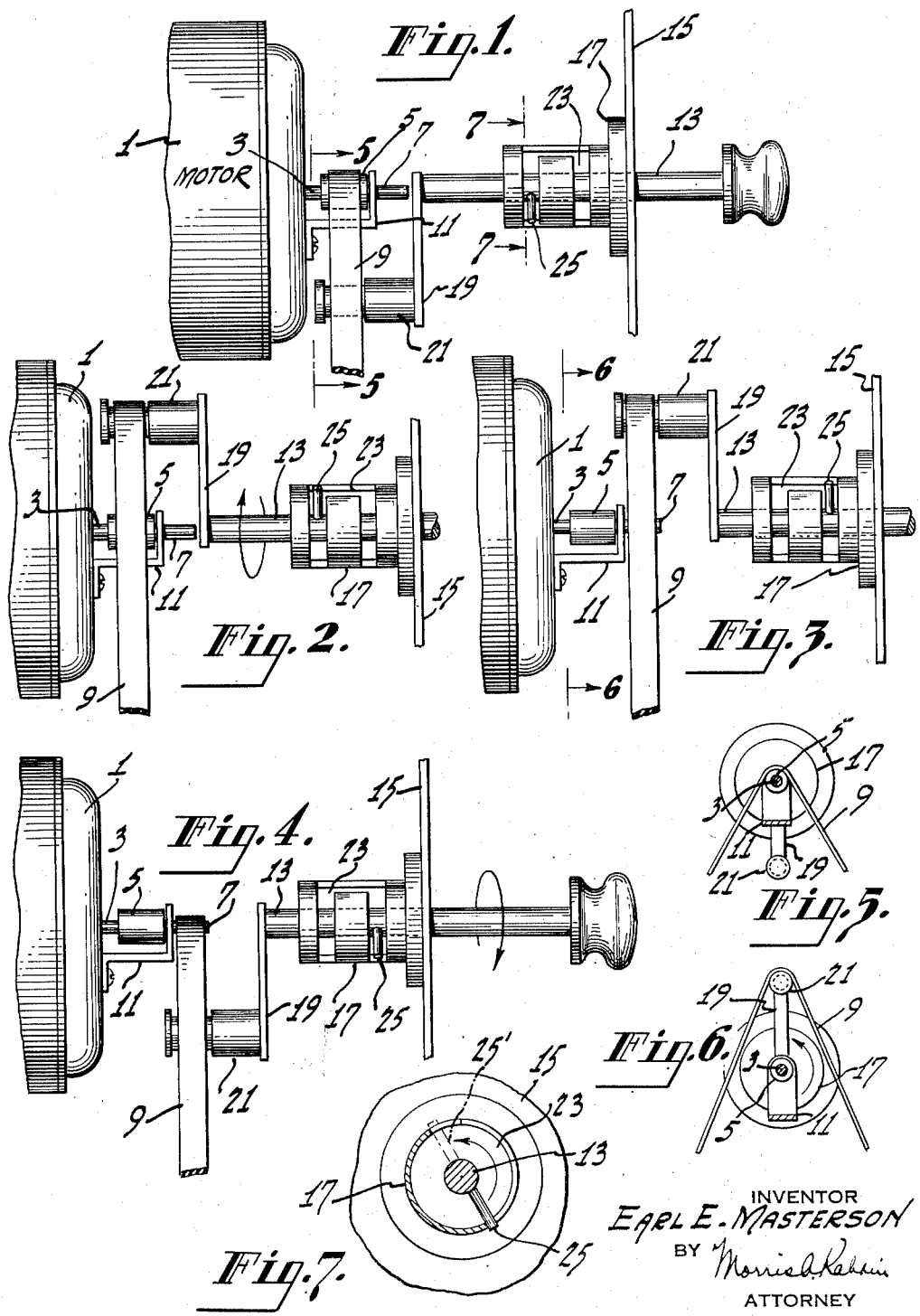

2,627,186

UNITED STATES PATENT OFFICE 2,627,186

BELT-DRIVE POWER TRANSFER SYSTEM

Earl E. Masterson, Palmyra, N. J., assignor to Radio Corporation of America, a corporation of Delaware Application June 30, 1950, Serial No. 171,491

6 Claims. (Cl. 74—242.3)

The present invention relates to belt drive power transfer systems, and more particularly to belt shifting mechanisms for such systems.

In belt-drive power transfer systems, it is frequently desirable to be able to drive a driven element at any one of several speeds. In such cases, the means for effecting the speed change should be simple, yet efficient in structure and operation. This is particularly true in certain relatively small apparatus. Such apparatus may well be represented by a magnetic record phonograph. In apparatus of this type, sounds are recorded as magnetic signals on a tape or wire record medium. However, some records are made with driving the medium at a linear speed different from that of other records. For example, some records are made with a linear speed of 15 inches per second while others are made at 7.5 inches per second. In order to render a magnetic record phonograph suitable for use with tape upon which signals have been recorded at either speed, it becomes necessary to provide a two-speed driving system for the medium.

It is therefore an object of the present invention to provide an improved, variable speed, belt-drive power transfer system.

It is another object of this invention to provide an improved speed changing mechanism for such systems.

A further object of this invention is the provision of an improved, simple, belt shifting mechanism for use with belt-drive power transfer systems.

In accomplishing these and other objects, there have been provided a plurality of coaxially arranged driving pulleys. One of the driving pulleys is coupled in driving relation, by a belt, to a driven pulley. A shaft is mounted in a position substantially coaxial with the driving pulleys. A crank arm is rigidly fastened to one end of the shaft and an idler is carried by the crank arm. The shaft is so mounted that it may be moved in both a rotational and an axial direction. Rotation of the shaft through substantially 180° causes the idler to engage the belt and lift it out of engagement with whichever pulley it happens to be running on. While the belt is thus held out of engagement with the pulley, an axial movement of the shaft will shift the belt out of the plane of the aforesaid pulley and into the plane of a second driving pulley. If, then, the shaft is rotated back to its original position the belt will be engaged in driving relationship with the second pulley. If the diameters of the driving pulleys are different, there is thus produced a change in the linear speed of the belt and hence in the angular speed of the driven pulley.

A better understanding of the present invention may be had from the following detailed description when read in connection with the accompanying drawing wherein:

Figures 1 through 4 are side elevations of one form of my invention showing the invention in the various steps of shifting a belt from one pulley to another;

Figure 5 is a view partly in cross-section and of reduced scale taken along the line 5—5 of Figure 1 looking in the direction of the appended arrows;

Figure 6 is a view partly in cross-section and of reduced scale taken along the line 6—6 of Figure 3 and looking in the direction of the appended arrows; and Figure 7 is an enlarged view taken along the line 7—7 of Figure 1 and looking in the direction of the appended arrows.

Referring to the drawings in more detail, in Figure 1 there is shown a motor 1 having a shaft 3 which carries a pair of driving pulleys 5 and 7. A belt 9 couples the pulley 5 to a driven pulley (not shown). A bracket 11 serves the dual purpose of supporting the driving pulleys 5 and 7 and preventing the belt from accidentally slipping from one pulley to the other. A shaft 13 is supported on a mounting panel 15 by a bearing 17 in a position substantially coaxial with the pulleys 5 and 7. Affixed to the end of the shaft nearest the pulley is a crank arm 19 which in turn supports an idler 21. The bearing 17 is provided with a guide channel or opening 23 in which a follower pin 25 secured to the shaft 13 is adapted to ride. In Fig. 7, the cross-sectional end view shows the follower pin 25 in its normal or rest position in the channel 23. The position occupied by the pin drawn in dotted lines 25' is the raised position, as shown in Figures 2, 3 and 6. For convenience, the guide channel is shown to be substantially U-shaped and permits substantially 180° of rotation of the shaft 13. The axial movement of the shaft permitted by the guide channel is sufficient to allow the idler 21 to be aligned with either of the pulleys 5 and 7.

The operation of the mechanism to effect a change in the speed of a driven element is illustrated, step by step, in Figures 1 to 4. In Figure 1, the belt 9 is shown as being driven by the larger pulley 5. The idler 21 is aligned with, but disengaged from, the belt 9. The position of the idler with respect to the belt, while in its normal or rest position, is shown more clearly in Figure 5. Rotation of the shaft 13 causes the idler 21 to lift the belt 9 out of engagement with the larger pulley 5, as shown in Figure 2. The belt is then carried to a position of alignment with the smaller pulley 7 by axial movement of shaft 13 to the right, as shown in Figure 3. If the shaft 13 is then rotated back through substantially 180°, the belt is permitted to engage the smaller pulley 7 as shown in Figure 4. Shifting the belt, in the manner set forth above, from a pulley of one size to a second pulley of a different size then changes the linear speed of the belt, thus producing a change in the angular speed of a driven element coupled thereto. It should be obvious, from an examination of the drawings, that the steps discussed above may be practiced in reverse order, that is, the belt may be shifted from the smaller pulley to the larger pulley.

The relative movements and positions of the shaft 13 may be restricted to a particular pattern established by the cooperative relation between the guide channel 23 in the bearing 17 and the follower pin 25 on the shaft. When the movements of the shaft are so constrained, the idler member 21 must always be in alignment with the belt. Though the guide channel has been shown and described herein as being substantially U-shaped for purposes of illustration, the invention should not be interpreted as being restricted to the particular shape of the channel.

In such a combination, the belt may be made of an elastic material whereby sufficient tension is maintained between the pulleys of the system to effect an efficient power transfer, but at the same time to be sufficiently yieldable that it may be stretched to accommodate the additional path length defined by the idler when the belt is lifted off of the pulleys as shown in Figures 2, 3 and 6. It may also be made of relatively non-stretching material, such as leather, but made sufficiently long to accommodate the maximum path length, tension being maintained when the belt is in the driving position by an auxiliary tensioning means.

The geometry of the system should be so arranged that, when the belt is in driving relation with the pulley, the idler 21 does not engage the belt or in any way interfere with the efficient operation thereof, as shown in Figure 5. Further, the arrangement should be such that when the belt is disengaged from the pulleys by the idler, as shown in Figure 6, the belt clears both of the pulleys and the supporting bracket 11.

It may be seen, from the foregoing description, that there has been provided a novel, efficient and simple speed changing mechanism for belt-drive power transfer systems. Although but one specific embodiment of the invention has been illustrated, it will be apparent that various changes and other modifications are possible within the spirit of my invention. For example, the shaft 13 need not necessarily be coaxial with the shaft 3 and its pulleys 5 and 7. Other changes will, no doubt, be readily apparent. Hence, it is desired that the foregoing shall be taken as illustrative and not as limiting.

What is claimed is:

1. A belt shifting mechanism for a belt adapted to cooperate with a pulley, said mechanism comprising, in combination, a shaft mounted for axial and rotational movement, a crank arm fastened to one end of said shaft, and a belt lifting idler secured to said crank arm, rotational movement of said shaft causing said idler to lift the belt from the pulley to a position where an axial movement of said shaft shifts the belt from the plane of said pulley.

2. A speed changing mechanism for a belt-drive power transfer system including a pair of coaxial pulleys, said mechanism comprising, in combination, a shaft mounted for axial and rotational movement, said shaft being substantially coaxial with the pulleys of the belt-drive system, a crank arm fastened to one end of said shaft, and a belt lifting idler secured to said crank arm, said idler being adapted, upon a rotational movement of said shaft, to engage and lift the belt from one of said pulleys and, upon axial movement of said shaft, to shift said belt from about said one pulley to a position about the other of said pulleys where, upon a further rotational movement of said shaft, said idler allows said belt to engage said other pulley.

3. A variable speed belt-drive power transfer system comprising, in combination, a plurality of driving pulleys of different diameters, said pulleys being mounted coaxially, a belt cooperatively engaging one of said pulleys, a shaft mounted for axial and rotational movement, said shaft being supported in a position substantially coaxial with said driving pulleys, a crank arm fastened to said shaft, and a belt-lifting idler secured to said crank arm, said idler being adapted to engage and lift said belt from said one pulley upon rotational movement of said shaft and, upon axial movement of said shaft, to shift said belt from about said one pulley to a position about the second one of said pulleys where, upon further rotational movement of said shaft, said belt is allowed to engage said second pulley.

4. The invention as set forth in claim 3 and characterized by the addition of guide means associated with said shaft whereby said idler is maintained in alignment with said belt.

5. The invention as set forth in claim 4 wherein said guide means comprises a fixed bearing for supporting said shaft, said bearing having a guide opening therein, and a follower pin attached to said shaft and adapted to ride in said opening thereby establishing a predetermined pattern of movement for said shaft.

6. The invention as set forth in claim 5 wherein said opening is substantially U-shaped.

EARL E. MASTERSON.

REFERENCES CITED

The following references are of record in the file of this patent:

UNITED STATES PATENTS

| Number | Name | Date |
|---|---|---|
| 367,891 | Canning | Aug. 9, 1887 |
| 2,363,002 | Jacquith | Nov. 21, 1944 |